Sept. 6, 1932. C. VAN RENNES 1,875,782
VALVE FOR AIRBAGS
Filed April 4, 1930
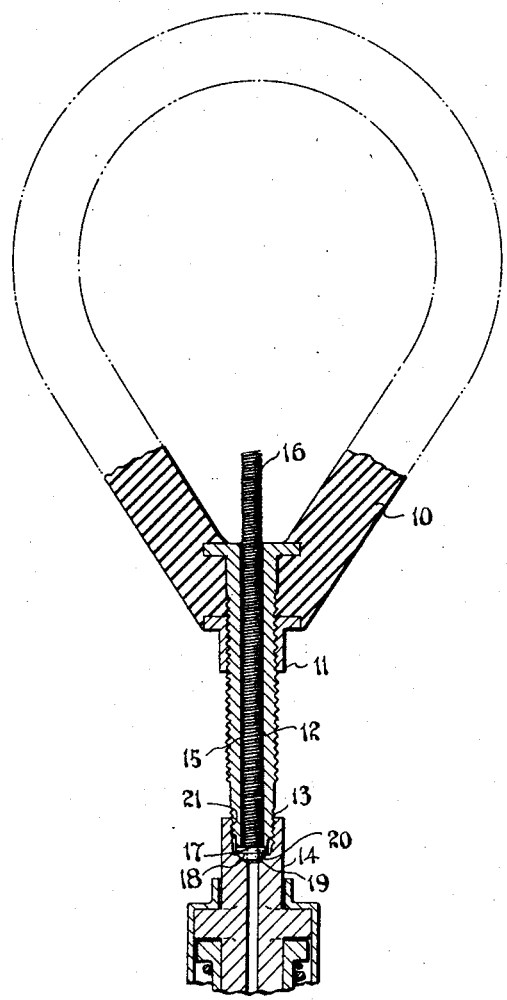
Inventor
Cornelis Van Rennes
By
Attorney Patented Sept. 6, 1932

1,875,782

UNITED STATES PATENT OFFICE

CORNELIS VAN RENNES, OF FLUSHING, NEW YORK, ASSIGNOR TO THE GOODYEAR TIRE & RUBBER COMPANY, OF AKRON, OHIO, A CORPORATION OF OHIO

VALVE FOR AIRBAGS

Application filed April 4, 1930. Serial No. 441,483.

This invention relates to inflatable containers employed as interior supports for pneumatic tire casings during vulcanization of the latter, and it has particular relation to an improved form of valve stem which comprises a part of the container.

An object of the invention is to provide a valve stem for an inflatable rubber container of the above-designated type, which will normally prevent the discharge of fluid in the airbag employed for preventing deterioration of the rubber in the container during the vulcanizing of tires.

Another object of the invention is to provide a valve stem for an inflatable container, including a device for accomplishing the aforesaid object, which is inexpensive and readily replaceable if the latter becomes necessary.

At the present time inflatable containers or so-called airbags, composed of rubber, are provided for supporting the inner surface of pneumatic tire casings during vulcanizing of the latter. Each airbag is employed repeatedly and, consequently, is repeatedly subjected to vulcanizing temperatures. Hence, it is desirable, if not necessary, that some means be provided for preventing over-curing of the walls of the airbag. One method practiced at the present time for preventing over-curing of the walls of the airbag, involves the use of glycerine which is injected into the airbag. The glycerine to a large extent, prevents the heat within the airbag from over-curing the rubber therein and also prevents oxidation of the latter. One objection to the use of fluid of this character is that frequently it flows through the valve stem and contacts with unvulcanized rubber products located in the vicinity of the airbag particularly during insertion of the latter into the tire, and vulcanization of those portions of the unvulcanized rubber products which have come in contact with the fluid is retarded. Consequently, uniform vulcanization of such products is prevented.

This invention comprises a simple and efficient means for preventing the discharge of the glycerine from the airbag and, consequently, avoids the aforesaid difficulties incidental to the use of fluids of this character. Particularly, the invention comprises a helical spring disposed in the valve stem of the airbag, and which projects substantially into the interior of the bag. The convolutions of the spring are closely wound, and the portion of the spring projecting into the interior of the bag, prevents the glycerine from flowing into the opening in the inner end of the valve stem. Another advantage which follows from the use of a spring is that the end of the latter projecting into the airbag, is flexible, and, consequently, any deformation of the walls of the airbag which causes such walls to contact with the inner end of the spring, will not result in any damage to such walls. The outer end of the spring is provided with a collar contacting with the outer end of the valve stem and is maintained in position by an adapting member threaded upon the outer end of the valve stem and engaging the collar. It is apparent that the spring is readily removable and that a new spring may be inserted into the valve stem, should for any reason a spring fail during its use.

For a better understanding of the invention, reference may now be had to the accompanying drawing in which the figure is a cross-sectional view of an airbag employed during the vulcanizing of tires, embodying a device constructed according to one form of this invention.

Referring to the figure, an airbag 10 is provided with a valve stem 11 having an opening 12 extending throughout its length. The outer end of the valve stem is threaded as indicated at 13 for receiving a threaded adapting member which serves as a connection between the valve stem and a conduit (not shown), communicating with a source of air or other similar medium highly compressed. During the vulcanizing of tires, usually air under high pressure is supplied to the interior of the airbag.

A helical spring 15 is disposed in the opening 12 in the valve stem 11, and has a portion 16 projecting substantially into the interior of the airbag, as for example, a distance of three-fourths of an inch. The coils of the spring 51 are closely wound and constitute a flexible tubular member having walls which substantially prevent any fluid from flowing between the convolutions thereof. Such a spring is highly efficient particularly where glycerine and other viscous fluids are employed which do not readily flow through small interstices. The opposite end of the spring is welded or otherwise rigidly secured as indicated at 17, to a collar 18 normally abutting the outer end of the valve stem 11. In the particular embodiment of the invention illustrated, the collar 18 is provided with a tapered or conical end surface 19 which is adapted to contact with a complementary surface 20 provided in an opening 21 in the end of the adapting member 14 threaded upon the valve stem. It is apparent that by turning the adapting member in the direction which threads it upon the valve stem, the collar 20 may be forcefully moved against the outer end of the valve stem, and any leakage of air past the collar thereby prevented. Manifestly, the collar may be of various shapes and the adapting member correspondingly constructed to secure the collar in position.

The projecting end portion 16 of the spring 15 effectively prevents any glycerine which collects adjacent the inner end of the valve stem from flowing through the opening 12, and thus discharging through the latter. Since the projecting portion 16 of the spring 15 is flexbile, it will not injure the walls of the airbag contacting therewith during deformation of the latter and this arrangement obviates the injurious effects which heretofore resulted from the use of glycerine or other similar fluids in airbags.

Although only the preferred form of the invention has been described and illustrated, it will be apparent to those skilled in the art that the invention is not so limited but that various modifications may be made therein without departing from the spirit of the invention or from the scope of the appended claims.

What I claim is:

1. The combination with an inflatable container having a tubular valve stem communicating with the interior of the container, of a flexible device disposed in the valve stem opening and projecting a substantial distance into the interior of the container.

2. The combination with an inflatable container having a tubular valve stem communicating with the interior of the container, of a flexible tubular device disposed in the opening in the valve stem and projecting a substantial distance into the interior of the container.

3. The combination with an inflatable container having a tubular valve stem communicating with the interior of the container, of a helical spring disposed in the opening in the valve stem and projecting into the interior of the container.

4. The combination with an inflatable container having a tubular valve stem communicating with the interior of the container, of a helical spring disposed in the opening in the valve stem and projecting into the interior of the container, the convolutions of the spring being closely wound to provide a tubular wall substantially impervious to liquids.

5. The combination with an inflatable container having a tubular valve stem communicating with the interior of the container, of a helical spring disposed in the opening in the valve stem and projecting into the interior of the container, said spring having a collar secured thereto for removable engagement with the end of the valve stem.

6. The combination with an inflatable container having a tubular valve stem communicating with the interior of the container, of a closely wound helical spring disposed in the opening in the valve stem, and projecting into the interior of the container, said spring having a collar on its outer end for removable engagement with the end of the valve stem.

7. The combination with an inflatable container having a tubular valve stem communicating with the interior of the container, of a helical spring disposed in the opening in the valve stem and projecting into the interior of the container, said spring having a collar secured thereto for removable engagement with the end of the valve stem, and means for holding the collar against the end of the valve stem.

In witness whereof, I have hereunto signed my name.

Signed at Jamaica, in the county of Queens and State of New York, U. S. A., this 27 day of March, 1930.

CORNELIS VAN RENNES.